Figure 1:
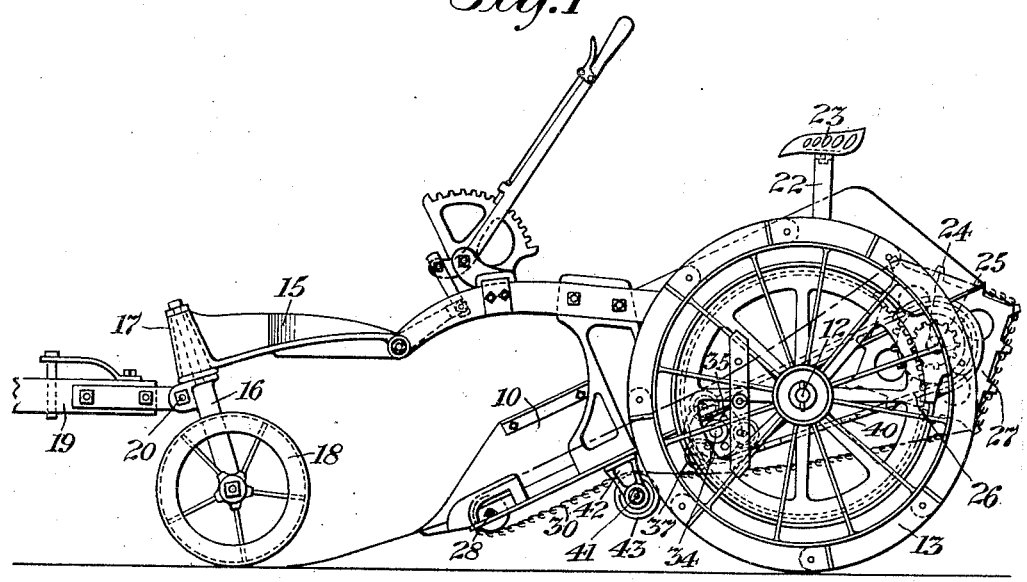

L. A. ASPINWALL.
POTATO DIGGER.
APPLICATION FILED FEB. 4, 1919.

1,341,454.

Patented May 25, 1920.
2 SHEETS—SHEET 1.

INVENTOR
Lewis Augustus Aspinwall
BY
HIS ATTORNEY

L. A. ASPINWALL.
POTATO DIGGER.
APPLICATION FILED FEB. 4, 1919.
1,341,454.
Patented May 25, 1920.
2 SHEETS—SHEET 2.
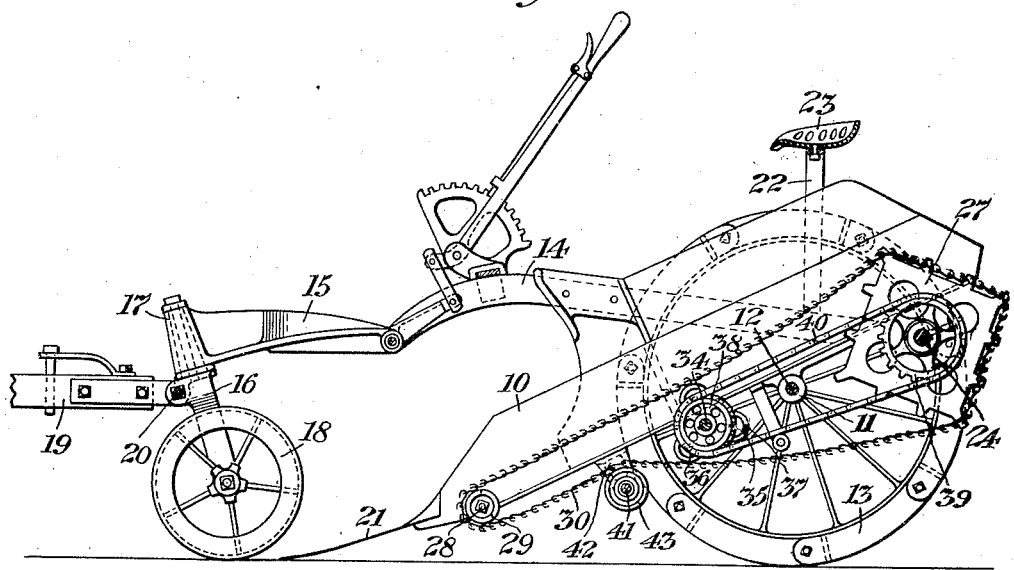
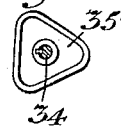
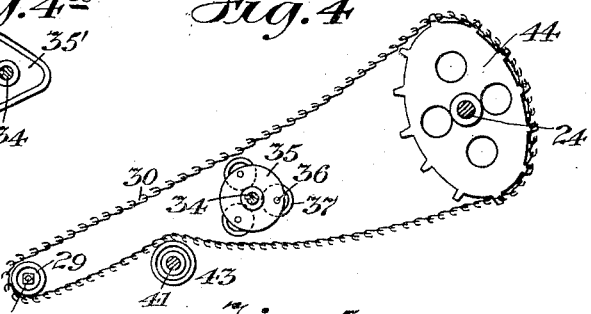
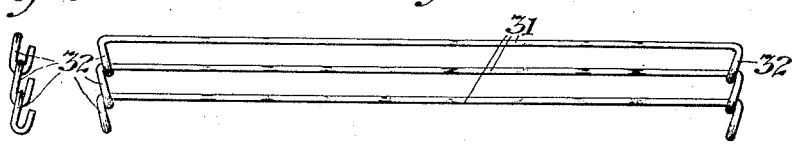
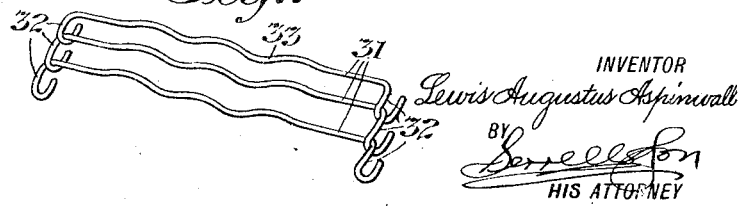
INVENTOR
Lewis Augustus Aspinwall
BY
HIS ATTORNEY

UNITED STATES PATENT OFFICE.

LEWIS AUGUSTUS ASPINWALL, OF JACKSON, MICHIGAN, ASSIGNOR TO ASPINWALL MFG. CO., A CORPORATION OF MICHIGAN.

POTATO-DIGGER.

1,341,454.   Specification of Letters Patent.   Patented May 25, 1920.

Application filed February 4, 1919. Serial No. 274,875.

*To all whom it may concern:*

Be it known that I, LEWIS AUGUSTUS ASPINWALL, a citizen of the United States, residing at Jackson, in the county of Jackson and State of Michigan, have invented an Improvement in Potato-Diggers, of which the following is a specification.

This invention relates to a potato digger and more particularly to that type of potato digger in which endless conveyers are employed for carrying the potatoes as removed from the ground, loosening the earth therefrom, and suitably delivering the potatoes and vines from the digger. The objects of the present invention are to so construct the digger that the length of travel of the potatoes and the consequent weight of the earth on the conveyer is materially reduced, thereby decreasing the power necessary to drive the apparatus and making its manipulation easier. In obtaining these objects of the invention, I employ devices for simultaneously actuating the conveyer and agitating the working portion thereof, which devices preferably comprise irregularly shaped sprockets by which the upper or working portion of the conveyer is regularly raised and lowered in such a manner as to agitate this portion of the conveyer with movements of sufficient force to loosen the earth from the potatoes thereby causing the separation of the same, permitting the earth to fall through the apparatus and the potatoes and vines to be carried to the delivery point. Together with these devices for simultaneously actuating the conveyer and agitating the working part thereof, I also prefer to employ auxiliary agitating devices for regularly and intermittently agitating the working portion of the conveyer in approximately the central part thereof. Also included as a portion of the present invention is the construction of the conveyer device itself which is so made as to facilitate the loosening and separation of the earth from the potatoes, as well as the carrying of the potatoes from the plow to the delivery point, and the construction furthermore is such as to prevent the piling of the earth at the lower side of the digger when the same is working in a hilly or rolling country. To accomplish this, the conveyer is constructed of rods which are not only hooked and hinged at their extremities to form the conveyer, but in their central portions are provided with preferably staggered corrugations so as to accomplish these purposes.

Figure 2:
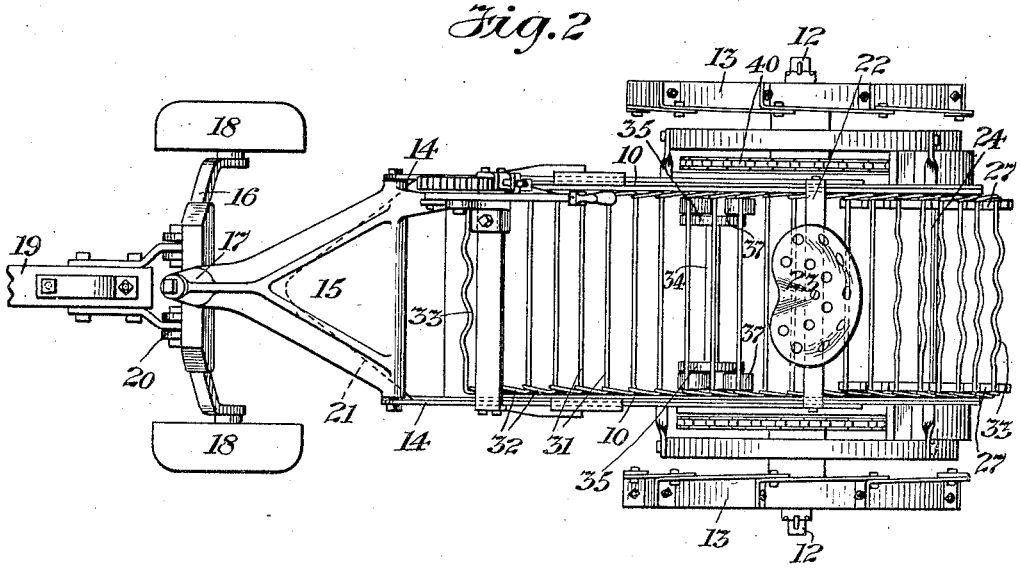

The construction of my improved potato digger will be hereinafter more particularly described in conjunction with the accompanying drawings in which, Figure 1 is a side elevation of my improved digger, Fig. 2 is a plan of the same, Fig. 3 is a sectional elevation, Fig. 4 is a diagrammatic elevation of the conveyer showing a modified form of the sprocket, Fig. 4$^a$ is an elevation of a modified form of the auxiliary agitator, Fig. 5 is a plan of a section of the conveyer, Fig. 6 is an end elevation of the same, and Fig. 7 is a perspective view of the conveyer member.

Referring to the drawing, my improved potato digger preferably comprises a frame having side members 10 which are made of any suitable material and connected in any desired manner so as to be suitably braced relatively to one another. In each of the side members 10 there is a bearing 11 in which the axle 12 is journaled. Mounted on the axle 12 there are the traction wheels 13, it being understood that the wheels may be suitably connected to the axle. Extending from the upper front portion of the sides 10, there are truss arms 14 between the forward extremities of which a swivel plate 15 is pivotally connected. Secured in this swivel plate is a yoke axle 16, the same being pivotally mounted therein preferably at an angle to the vertical as indicated at 17, and mounted on the yoke axle 16 are the front wheels 18. The digger also includes the usual draft pole 19 which is pivotally connected to the yoke axle as indicated at 20. Furthermore, as is customary in potato diggers, a plow 21 is suitably mounted between the forward extremities of the side members 10, and in the frame there is connected a seat post 22 carrying the driver's seat 23. The members hereinbefore described comprise no part of the present invention which relates more particularly to the conveyer and agitating devices as hereinafter described.

My potato digger also includes a shaft 24 mounted in suitable bearings provided for this purpose in the side members of the digger. On this shaft 24 is mounted a gear 25 meshing with a gear 26 which is secured either on the axle 12 or to the traction wheel on the corresponding side of the digger, it being understood that this gear 26 may be suitably mounted and connected either to the shaft or to the wheel or to both, in such a manner as to drive the gear 25 and the shaft 24 from the axle and traction wheel. Also mounted on the shaft 24 are sprockets 27. As indicated in Figs. 1 and 3, I prefer to make these sprockets 27 square, although of course, the same are not limited to this particular shape.

In the lower forward portion of the side members 10 in corresponding positions there are bearings in which stub shafts 28 are journaled, and on these stub shafts 28 there are mounted rollers 29. 30 indicates the conveyer which is preferably an endless conveyer, and made to pass over the sprockets 27 and rollers 29 which are placed adjacent the inner faces of the side members 10. This conveyer is preferably made of rods of suitable material, the rods being indicated at 31. Each rod at its extremity is looped as indicated at 32 to form a hook by which it is connected to the next adjacent conveyer rod, and each rod 31 is preferably corrugated as indicated at 33, the waves or curves being placed in staggered positions in the respective rods for the purposes hereinbefore mentioned.

I also employ a cross shaft 34 which extends between the side members of the digger and is journaled in bearings provided in the same for this purpose. On this shaft 34 adjacent the inner faces of the side members, disks 35 are mounted. In each disk there is a series of pins 36, and on each pin a roller 37 is mounted. The position of the shaft 34 and the diameters of the disks and the rollers is such that by turning the shaft 34 each of the rollers in turn is brought to bear against the outer portion of the endless conveyer so as to strike and raise the same and permit it to fall in comparatively rapid movements so as to constitute auxiliary devices for agitating the working portion of the conveyer. The diameter of the rollers 37 is sufficiently large to produce a toggle action between the same and the disk 35 as each roller successively strikes the conveyer 30 and is turned on its axis thereby, these relatively large rollers 37 being employed to insure the lifting of the conveyer 30 to produce an adequate agitation therein and by utilizing a minimum amount of power to accomplish this result. I am aware that agitators are used in most elevator diggers which are turned by the travel of the rods, but give little or no agitation. These devices are usually rectangular and produce a slight lifting movement in the elevator rather than a sudden agitation and consequent rapid separation. The shaft 34 is driven from the shaft 24 by a sprocket 38 which is mounted on the shaft 34, and a sprocket 39 which is mounted on the shaft 24, the sprockets 38 and 39 being connected by a chain 40.

In view of the fact that the sprocket 38 on the auxiliary agitating shaft 34 is smaller than the sprocket 39 on the shaft 24, and the further fact that the square sprockets 27 are relatively larger than the sprockets 39, the revolution of the shaft 34 and the consequent speed at which the auxiliary agitating devices are revolved is relatively rapid in comparison with the speed at which the conveyer 30 travels. In reality, these so-called auxiliary agitators strike the conveyer in rapid succession and may more properly be called beaters. In no instance, however, is the blow imparted to the conveyer sufficient to bruise the potatoes, inasmuch, as in no position is the conveyer moved upwardly more than about one half inch in being struck by the auxiliary agitators or beaters. Still furthermore as will also be apparent, the auxiliary agitators or beaters are turned to strike the conveyer in the direction in which it travels so as to assist rather than retard the travel of the conveyer.

In order to prevent too great a sag in the lower and non-working side of the conveyer I also employ a cross-shaft 41 mounted in journals provided therefor in brackets 42 which are suitably attached to the sides 10 of the digger and on which shaft there are idler pulleys 43 adapted to maintain the lower and non-working portion of the conveyer in a sufficiently raised position, as is common in most elevator diggers.

As hereinbefore stated, while I prefer to employ the agitating sprockets 27 in square or rectangular form, the shape of these sprockets is not necessarily limited to this configuration, for example as illustrated in Fig. 4, they may be made elliptical, and as will be understood, other forms of the agitating sprockets may be used without departing from the nature and spirit of this invention.

Also by reference to Fig. 4ª, it will be seen that instead of employing the disks 35 with the rollers 37 placed in triangular positions thereon for auxiliary agitating devices, I may mount on the shaft 34 plain triangular cam members 35', the corners of which are preferably rounded as indicated in this figure. It will be understood however, that this modified form of auxiliary agitator may be square or of other configuration as well as triangular, without departing from the nature and spirit of this invention.

In the use of the invention hereinbefore described, the upper or working portion of the conveyer is raised and lowered or agitated with sufficient violence by the agitating sprockets 27 to loosen the earth and cause a separation of the same from the potatoes, and in addition to these primary agitating devices, I also prefer to employ the auxiliary agitating devices comprising the rollers 37 placed in triangular positions on the disks 35 and so situated preferably mid-way of the working portion of the conveyer as to strike and raise and permit this portion of the conveyer to fall. Also as hereinbefore indicated, the waved or curved construction of the conveyer rods materially assists in the elevation of the potatoes as well as in the loosening of the earth and the preventing of the same from piling up on the side of the digger when the same is working in a rolling or hilly country.

I claim as my invention:

1. In a potato digger, a frame, a conveyer, conveyer rollers mounted at the front of the digger, and rectangular conveyer sprockets mounted at the rear of the digger and each having a plurality of straight edges, with the length of each edge being a multiple of the length of each link in the conveyer so that the conveyer is simultaneously supported, driven and agitated by the said rectangular sprockets in the revolution of the same.

2. In a potato digger, a frame, traction wheels mounted thereon, a conveyer, conveyer rollers mounted at the front of the digger, rectangular conveyer sprockets mounted at the rear of the digger and each having a plurality of straight edges, with the length of each edge of each sprocket a multiple of the length of each link in the said conveyer so that the conveyer is supported by the said sprockets and simultaneously driven thereby so that the working portions of the conveyer are agitated by being driven by the said sprockets, and means for driving the rectangular conveyer sprockets from the traction wheels.

3. In a potato digger, a frame, traction wheels mounted thereon, a conveyer, conveyer rollers mounted at the front of the digger, rectangular conveyer sprockets mounted at the rear of the digger and each having a plurality of straight edges, with the length of each edge of each sprocket a multiple of the length of each link in the said conveyer so that the conveyer is supported by the said sprockets and simultaneously driven thereby so that the working portions of the conveyer are agitated by being driven by the said sprockets, means for driving the rectangular conveyer sprockets from the traction wheels, auxiliary devices for also agitating the working portion of the said conveyer, and means for driving the said agitating devices.

4. In a potato digger, a frame, traction wheels mounted thereon, an endless conveyer, conveyer rollers at the front of the digger, square sprockets at the rear of the digger for simultaneously supporting, driving and agitating the working portion of the conveyer, and means for driving the square sprockets from the traction wheels.

5. In a potato digger, a frame, traction wheels mounted thereon, stub shafts mounted in the lower front portions of the frame, rollers on the said shafts, a shaft mounted in the rear portion of the frame, square sprockets mounted on the last aforesaid shaft, an endless conveyer passing over the said square sprockets so as to be supported, driven and simultaneously agitated thereby, devices for driving the square sprockets and the shafts on which they are mounted from the traction wheels, an auxiliary shaft also journaled in the said frame, disks on the auxiliary shaft, spaced rollers mounted in the said disks for additionally agitating the working portions of the said conveyer, and means for driving the said auxiliary shaft from the shaft on which the square sprockets are mounted.

6. In a potato digger, a frame, an endless conveyer, means for driving the endless conveyer, an agitator for the conveyer, the parts of which agitator operate with a toggle action in striking the conveyer, and means for driving the agitator rapidly in the same direction as the travel of the conveyer.

7. In a potato digger, a frame, traction wheels mounted thereon, a conveyer, means for driving the conveyer, a conveyer agitator comprising a disk, a plurality of rollers mounted in spaced positions in the said disk, the said rollers being of relatively large diameter so as to produce a toggle action in striking the said conveyer, and means for revolving the agitator rapidly in the same direction as that in which the conveyer travels.

Signed by me this 20th day of January, 1919.

LEWIS AUGUSTUS ASPINWALL.